United States Patent
Kuroda et al.

(10) Patent No.: US 10,948,311 B2
(45) Date of Patent: Mar. 16, 2021

(54) ELECTRONIC RELIABILITY ENHANCEMENT OF A PHYSICAL QUANTITY SENSOR

(71) Applicant: PANASONIC INTELLECTUAL PROPERTY MANAGEMENT CO., LTD., Osaka (JP)

(72) Inventors: Keisuke Kuroda, Fukui (JP); Takeshi Mori, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 373 days.

(21) Appl. No.: 16/163,184

(22) Filed: Oct. 17, 2018

(65) Prior Publication Data

US 2019/0120655 A1   Apr. 25, 2019

(30) Foreign Application Priority Data

Oct. 25, 2017   (JP) ............................. JP2017-206288

(51) Int. Cl.
  *G01C 25/00*   (2006.01)
  *G01C 19/5614*   (2012.01)

(52) U.S. Cl.
  CPC ......... *G01C 25/00* (2013.01); *G01C 19/5614* (2013.01)

(58) Field of Classification Search
  CPC .................. G01C 25/00; G01C 19/5614
  See application file for complete search history.

(56) References Cited

U.S. PATENT DOCUMENTS

| | | | | |
|---|---|---|---|---|
| 9,392,171 | B2* | 7/2016 | Uemura | .................... H03F 3/72 |
| 9,885,586 | B2* | 2/2018 | Shimada | ............ G01C 19/5614 |
| 10,018,468 | B2* | 7/2018 | Murakami | ......... G01C 19/5614 |
| 10,534,015 | B2* | 1/2020 | Kuroda | ............. G01C 19/5614 |
| 10,848,159 | B2* | 11/2020 | Murakami | ............. H03B 5/364 |
| 2016/0341760 | A1 | 11/2016 | Kuroda et al. | |

FOREIGN PATENT DOCUMENTS

| | | |
|---|---|---|
| JP | H05-223844 A | 9/1993 |
| JP | 2003-264460 A | 9/2003 |
| JP | 2013-79972 A | 5/2013 |
| WO | 2015/128922 A1 | 9/2015 |

* cited by examiner

*Primary Examiner* — Natalie Huls
*Assistant Examiner* — Michael J Singletary
(74) *Attorney, Agent, or Firm* — McDermott Will and Emery LLP

(57) ABSTRACT

A sensor includes a detection element that outputs a detection signal corresponding to a physical quantity, a detection circuit that outputs a physical quantity signal corresponding to the physical quantity, first to third diagnosis circuits. The first diagnosis circuit is configured to receive a signal input to the detection circuit and a signal output from the detection circuit, to output an error signal in a case where the detection circuit is abnormal. The second diagnosis circuit is configured to input a diagnosis signal to the first diagnosis circuit. The second diagnosis circuit is configured to input, to the first diagnosis circuit, another of the signal input to the detection circuit and the signal output from the detection circuit. The third diagnosis circuit monitors whether or not the diagnosis signal is input from the second diagnosis circuit to the first diagnosis circuit.

9 Claims, 13 Drawing Sheets

ELECTRONIC RELIABILITY ENHANCEMENT OF A PHYSICAL QUANTITY SENSOR

CROSS-REFERENCE OF RELATED APPLICATION

This application claims the benefit of Japanese Application No. 2017-206288, filed on Oct. 25, 2017, the entire disclosure of which Application is incorporated by reference herein.

TECHNICAL FIELD

The present disclosure relates to a sensor of self-diagnosis to be used in, e.g. a vehicle.

BACKGROUND ART

A conventional sensor which causes an electrostatic force generating to displace a movable electrode so as to diagnose whether or not the sensor normally operates based on a change in a capacitor caused by the displacement is known. For example, Japanese Patent Laid-Open Publication No. 5-223844 and International Publication. No. 2015/128922 are known as related art documents related to such a sensor.

A sensor which diagnoses whether or not the sensor normally operates based on a signal after synchronous detection is known. For example, Japanese Patent Laid-Open Publication No. 2013-79972 is known as a related art document related to such a sensor.

A sensor which diagnoses whether or not the sensor normally operates by outputting an alarm signal when a result of comparison between a signal obtained by frequency-dividing a clock and a signal obtained by frequency-dividing an output clock of a voltage controlled oscillator is out of a range is known. For example, Japanese Patent Laid-Open Publication No. 2003-264460 is known as a related art document related to such a sensor.

Being required to have higher reliability, the conventional sensors may be insufficient to ensure reliability.

SUMMARY

A sensor includes a detection element that outputs a detection signal corresponding to a physical quantity, a detection circuit that outputs a physical quantity signal corresponding to the physical quantity, first to third diagnosis circuits. The first diagnosis circuit is configured to receive a signal input to the detection circuit and a signal output from the detection circuit, to output an error signal in a case where the detection circuit is abnormal, and not to output the error signal in a case where the detection circuit is normal. The second diagnosis circuit is configured to input a diagnosis signal to the first diagnosis circuit instead of one of the signal input to the detection circuit and the signal output from the detection circuit. The second diagnosis circuit is configured to input, to the first diagnosis circuit, another of the signal input to the detection circuit and the signal output from the detection circuit. The third diagnosis circuit monitors whether or not the diagnosis signal is input from the second diagnosis circuit to the first diagnosis circuit.

The sensor has high reliability.

DETAILED DESCRIPTION OF PREFERRED EMBODIMENT

Figure 1:
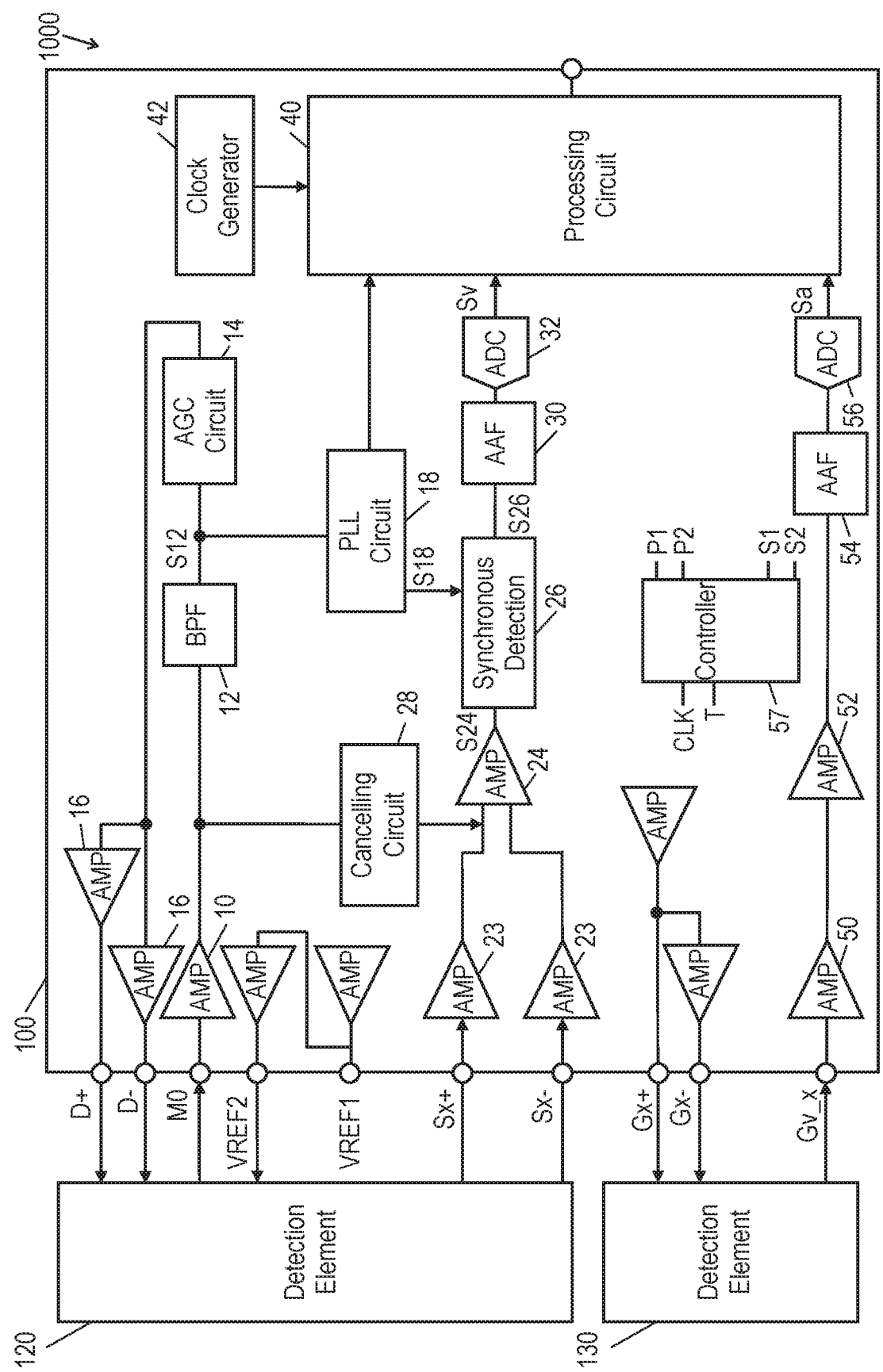
FIG. 1 is a block diagram of a sensor in accordance with an exemplary embodiment.
Figure 2A:
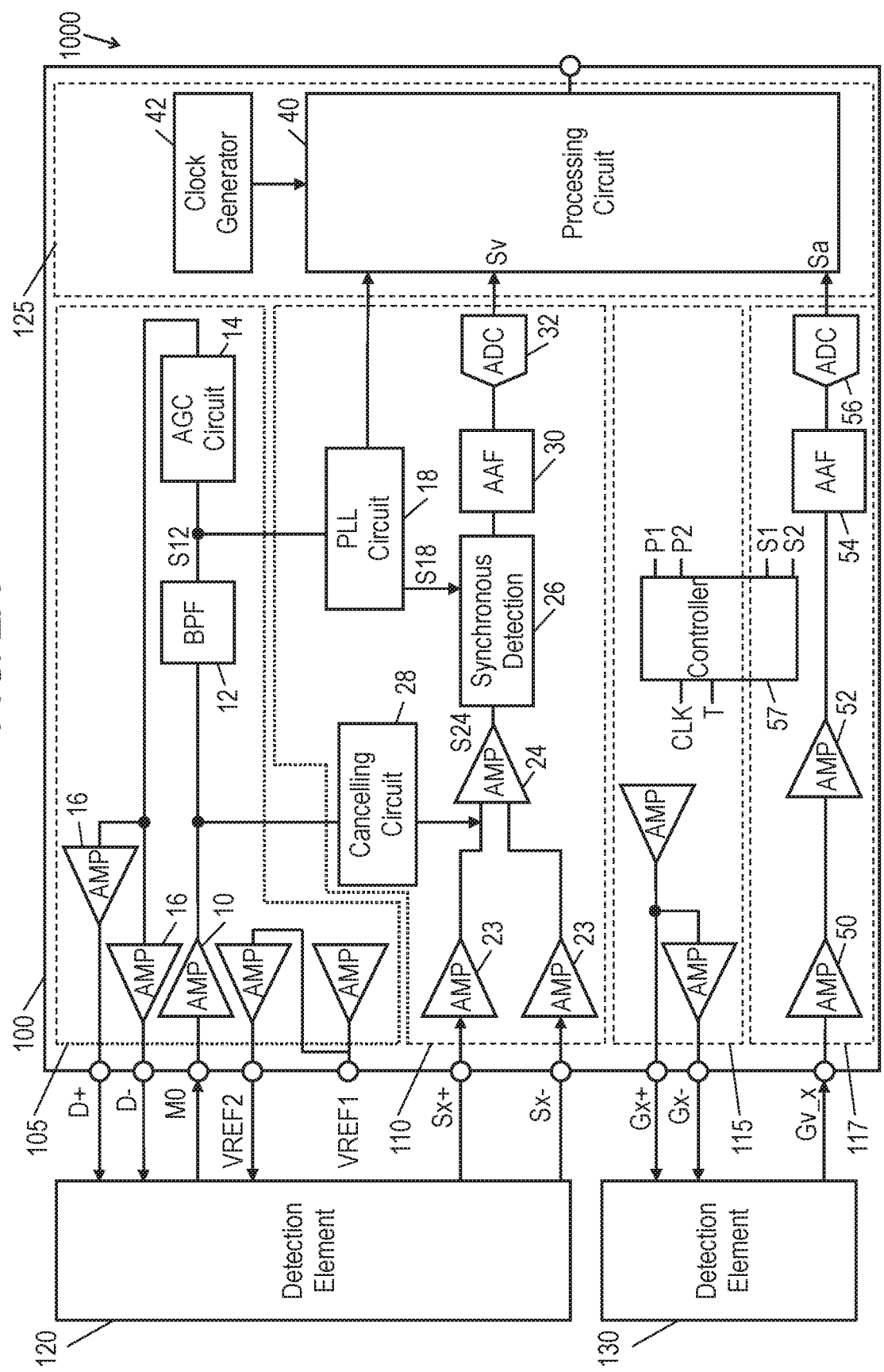
FIG. 2A is a block diagram of the sensor in accordance with the embodiment.

FIGS. 1 and 2A are block diagrams of sensor 1000 in accordance with an exemplary embodiment. FIG. 2A illustrates functional blocks of sensor 1000.

Sensor 1000 includes detection element 120 that outputs detection signals Sx+ and Sx− caused by an angular velocity applied thereto, detection element 130 that outputs detection signal Gv_x caused by an acceleration applied thereto, and circuit 100 electrically connected to detection elements 120 and 130.

Figure 2B:
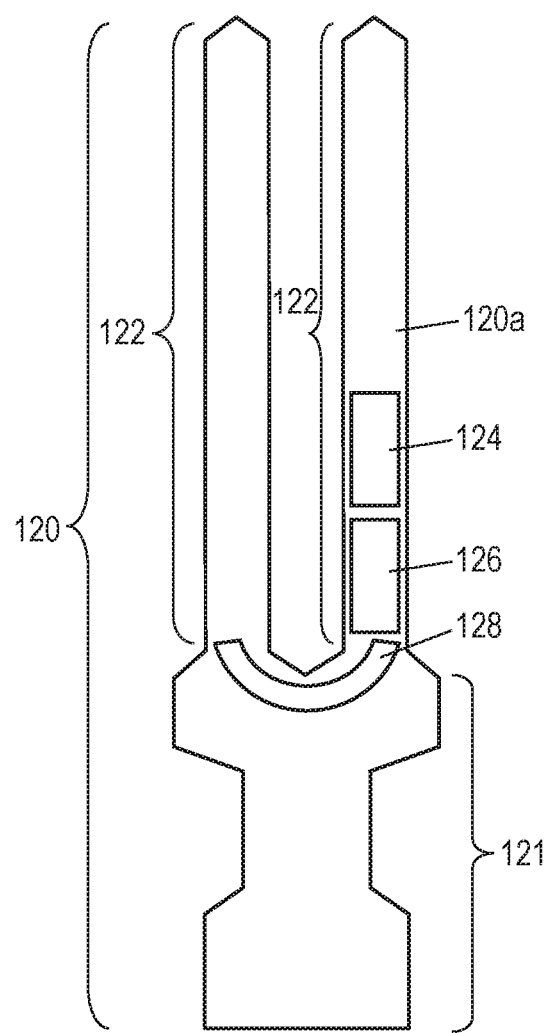
FIG. 2B is a plan view of a detection element of the sensor in accordance with the embodiment for detecting an angular velocity.

FIG. 2B is a plan view of detection element 120 for detecting an angular velocity.

Detection element 120 includes vibrator 120a having a tuning-fork shape including supporter 121 and a pair of arms 122 extending from supporter 121, and includes a piezo-electric body.

Detection element 120 includes vibrator 120a, driving electrode 126 receiving a driving signal for causing vibrator 120a to vibrate at a particular driving frequency, monitor electrode 128 that detects the frequency of the vibration of vibrator 120a and outputs the frequency as monitor signal MO, and detection electrode 124 that outputs detection signal Sx+ (Sx−). Detection electrode 124 generates detection signal Sx+ (Sx−) caused by the angular velocity applied to detection element 120 (vibrator 120a). Detection signal Sx+ (Sx−) is synchronized to monitor signal MO. Driving electrode 126 and detection electrode 124 are formed on arm 122. Monitor electrode 128 is formed near a boundary between supporter 121 and arm 122.

Figure 2C:
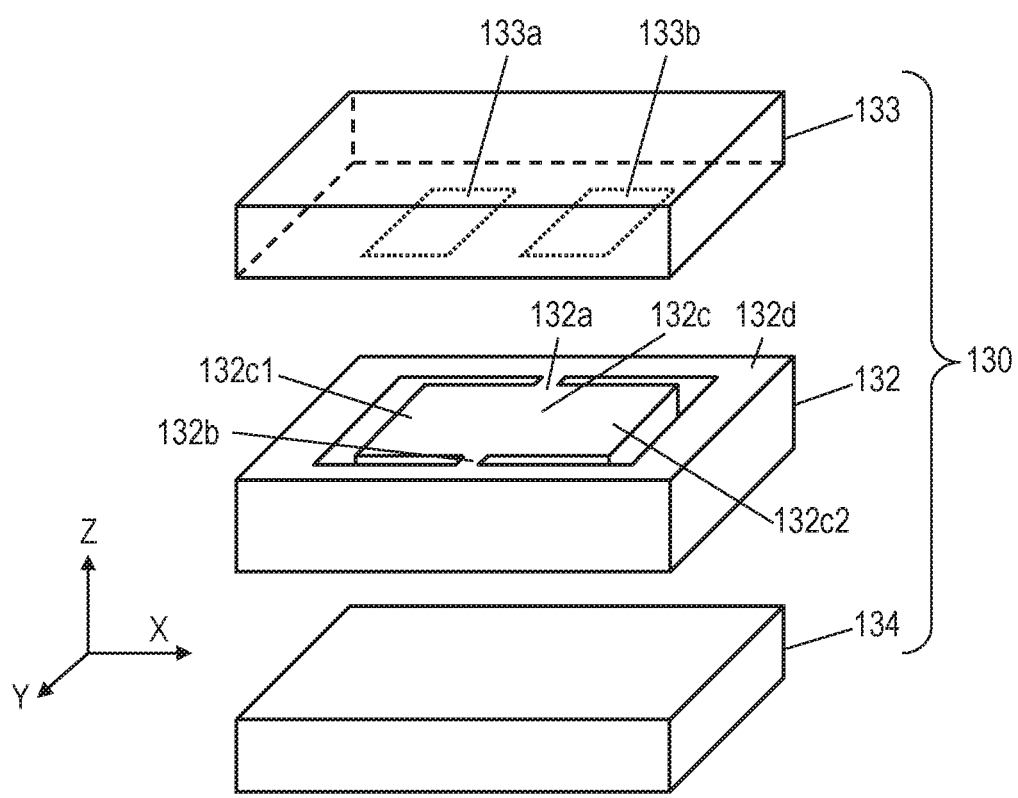
FIG. 2C is a plan view of a detection element of the sensor in accordance with the embodiment for detecting an acceleration.

FIG. 2C is a plan view of detection element 130 for detecting an acceleration. Detection element 130 includes sensor board 132, upper lid 133, and lower lid 134. Sensor board 132 is provided between upper lid 133 and lower lid 134. Sensor board 132 includes beams 132a and 132b, movable electrode 132c, and frame 132d. Fixed electrodes 133a and 133b are formed on upper lid 133. Fixed electrode 133a faces portion 132c1 of movable electrode 132c. Fixed electrode 133b faces portion 132c2 of movable electrode 132c. Movable electrode 132c is displaced in accordance with a change of an acceleration which is a physical quantity applied to the movable electrode.

Circuit 100 includes driver circuit 105, detection circuit 110, driver circuit 115, detection circuit 117, and signal adjustment circuit 125.

Driver circuit 105 inputs driving signals D+ and D− to detection element 120 to drive and vibrate detection element 120 at a particular driving frequency. Furthermore, monitor signal MO is input from detection element 120 to driver circuit 105. Monitor signal MO is generated by driving and vibrating detection element 120, and indicates a state of vibration of detection element 120.

Detection signal Sx+ and Sx− are input from detection element 120 to detection circuit 110. Detection circuit 110 outputs angular velocity signal Sv which is obtained by electrically processing input detection signals Sx+ and Sx−. Angular velocity signal Sv, is a physical quantity signal indicating an angular velocity.

Driver circuit 115 inputs carrier signals Gx+ and Gx− to detection element 130.

Detection element 130 inputs acceleration detection signal Gv_x to detection circuit 117. Detection circuit 117 outputs acceleration signal Sa which is obtained by electrically processing input acceleration detection signal Gv_x. Acceleration signal Sa is a physical quantity signal indicating an acceleration. The acceleration detection signal Gv_x is a signal generated due to an acceleration applied to detection element 130.

Monitor electrode 128 of detection element 120 inputs monitor signal MO to amplifier (AMP) 10.

A signal output from amplifier 10 is input to band pass filter (BPF) 12. Band pass filter 12 causes a signal component of the driving frequency of detection element 120 among input signals to pass through the BPF, and attenuates a signal component of frequencies different from the driving frequency so as to generate and output signal S12. The signal component of the frequencies different from the driving frequency is, for example, an unnecessary signal caused by mechanical resonance of vibrator 120a. Band pass filter 12 is provided in driver circuit 105.

Automatic gain control (AGC) circuit 14 includes a rectifier that receives an output signal of band pass filter 12 and a smoothing circuit that receives an output signal of the rectifier. AGC circuit 14 performs a control of amplifying or attenuating the output signal of band pass filter 12 based on an amplitude of the output signal of the smoothing circuit, and controlling the amplitude of the output signal of band pass filter 12. More specifically, in a case where the amplitude of monitor signal MO is small, the control increases amplitudes of driving signals D+ and D− by increasing a gain of automatic gain control circuit 14. Therefore, the control is performed such that the amplitude of the drive vibration supplied to detection element 120 increases and the amplitude of monitor signal MO is increased. On the other hand, in a case where the amplitude of monitor signal MO is large, the amplitudes of driving signals D+ and D− are decreased by decreasing the gain of automatic gain control circuit 14. Therefore, the control performed such that the amplitude of the drive vibration of detection element 120 is decreased and the amplitude of monitor signal MO is decreased. This control maintains the amplitudes of driving signals D+ and D−, that is, amplitude of the drive vibration of detection element 120 (vibrator 120a) to be substantially constant.

The output signal from automatic gain control circuit 14 is input to amplifier 16. Amplifier 16 outputs, to driving electrode 126, driving signals D+ and D− for driving detection element 120.

The output signal of band pass filter 12 is input to phase locked loop (PLL) circuit 18. PLL circuit 18 generates a PLL output signal synchronous to a phase of an input signal of the PLL circuit and having a frequency obtained by multiplying the frequency of the input signal. The PLL circuit generates detecting signal S18, which is the PLL output signal and is a clock signal having a phase shifted by 90 degrees from the phase of monitor signal MO, that is, the output signal of band pass filter 12.

Amplifier 23 amplifies an angular velocity detection signal output from detection electrode 124, and outputs the angular velocity detection signal to amplifier 24.

Cancelling circuit 28 outputs a cancelling signal. The cancelling signal is a signal for canceling an unnecessary signal component contained in the angular velocity detection signal. The cancelling signal is added to the angular velocity detection signal output from amplifier 23 so as to cancel a noise signal contained in the angular velocity detection signal. The noise signal referred to here is a signal appearing in the angular velocity detection signal due to a deformation of detection element 120 sue to the drive vibration by mechanical coupling (hereinafter, referred to as "MC") This signal is a noise signal generated due to a mismatching in mass balance of detection element 120, that is, asymmetry of the shape of the element. For example, in detection element 120 having the tuning-fork in accordance with the embodiment, a difference in mass of the pair of arms 122 produces the noise signal. In addition, the cancelling signal is generated by previously measuring the noise signal, storing the noise signal in a memory, and reading out the stored value.

Amplifier 24 is a differential amplifier that receives the output signal of amplifier 23, differentially amplifies the output signal, and outputs angular velocity detection signal S24.

Synchronous detection circuit 26 generates angular velocity detection signal S26 obtained by multiplying, by detecting signal S18, angular velocity detection signal S24 output from amplifier 24, and outputs angular velocity detection signal S26 to antialiasing filter (AAF) 30.

Antialiasing filter 30 outputs an angular velocity signal obtained by removing high frequency components from the angular velocity detection signal S26 indicating the angular velocity output from synchronous detection circuit 26.

Analog-to-digital converting (ADC) circuit 32 converts the angular velocity signal that is an analog signal output from antialiasing filter 30 into a digital signal (angular velocity signal Sv), and outputs the digital signal to processing circuit 40 that processes the digital signal.

Driver circuit 115 inputs carrier signal Gx+ to a node between movable electrode 132c and fixed electrode 133a of detection element 130, and inputs carrier signal Gx− to a node between movable electrode 132c and fixed electrode 133b.

Amplifier 50 receives the detection signal from detection element 130, and outputs a voltage signal corresponding to a change in a capacitor between movable electrode 132c and fixed electrode 133a, and to a change in capacitor between movable electrode 132c and fixed electrode 133b.

Amplifier 52 amplifies the voltage signal from amplifier 50.

Antialiasing filter 54 outputs a signal as the acceleration signal obtained by attenuating a noise component of a frequency bandwidth equal to or higher than half of a sampling frequency of AD converting circuit 56 in a subsequent stage from the output signal of amplifier 52.

Analog-to-digital converting circuit 56 converts the acceleration signal that is an analog signal output from antialiasing filter 54 to a digital signal (acceleration signal Sa), and outputs the digital signal to processing circuit 40.

Clock oscillator 42 generates an internal clock of circuit 100. The internal clock is used for operations of processing circuit 40, and AD conversion in the AD converting circuit.

Processing circuit 40 performs, to the angular velocity signal, various calculations, such as offset adjustment, gain adjustment, and digital filter calculation. Processing circuit 40 also performs electrical communication with an outside and control of various registers.

Figure 3:
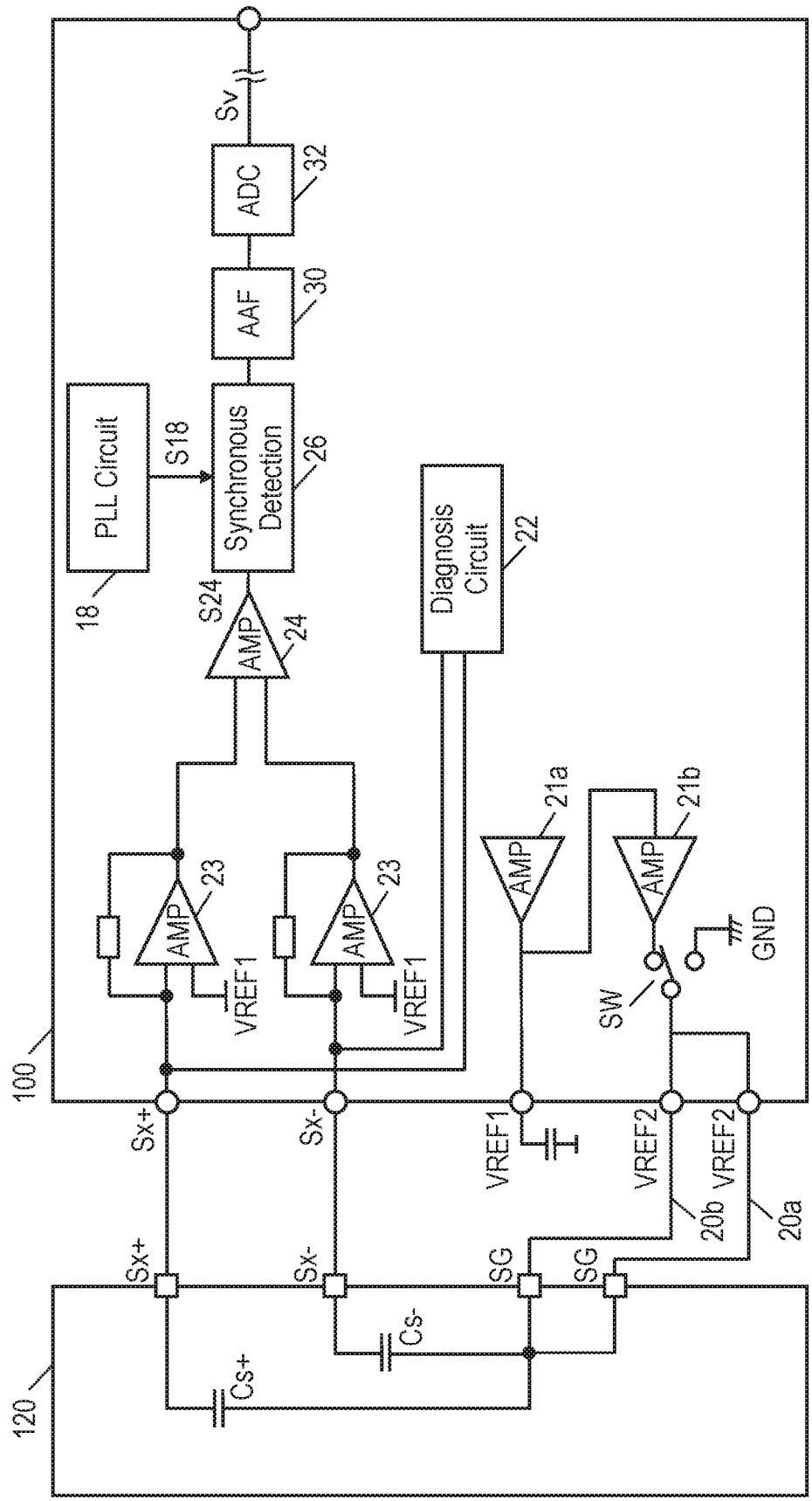
FIG. 3 is a block diagram of a part of the sensor in accordance with the embodiment.

FIG. 3 is a block diagram of a part of sensor 1000.

Circuit 100 includes amplifier 21a that outputs reference voltage Vref1, and amplifier 21b that outputs reference voltage Vref2.

Reference voltage Vref1 is a reference voltage used for operations of circuit 100. A terminal for outputting reference voltage Vref1 is connected to a capacitor.

Reference voltage Vref2 is a reference voltage of detection element 120. A terminal outputting reference voltage Vref2 and detection element 120 are electrically connected to wirings 20a and 20b. Reference voltage Vref2 is generated, for example, by dividing a voltage between a power supply and a ground with resistors. Reference voltage Vref2 is supplied to detection element 120. The drive vibration of detection element 120 (vibrator 120a) is generated by reference voltage Vref2 and driving signals D+ and D−.

When a wiring for supplying reference voltage Vref2 to detection element 120 breaks, the operation of sensor 1000 immediately stops. In sensor 1000 illustrated in FIG. 3, the wiring for supplying reference voltage Vref2 is redundant by two wirings 20a and 20b, hence enhancing the reliability of sensor 1000.

Circuit 100 includes switch SW that generates a voltage pulse by switching, to a ground potential, reference voltage Vref2 supplied to detection element 120, and supplies the voltage pulse to detection element 120. When the voltage pulse is supplied to detection element 120 while detection element 120 normally operates, an electric output change corresponding to the voltage pulse is detected by detection circuit 110. On the other hand, in a case where abnormality, such as disconnection of both wirings 20a and 20b for supplying reference voltage Vref2 to detection element 120, occurs, even if the voltage pulse is supplied to detection element 120, the electric output change corresponding to the voltage pulse is not detected by detection circuit 110. As described above, the abnormality of sensor 1000 can be detected based on the electric change corresponding to the voltage pulse. Circuit 100 of sensor 1000 further includes diagnosis circuit 22 for diagnosing the pulse voltage based on the electric change generated in detection circuit 110 when the pulse voltage is supplied to detection element 120, thereby enhancing the reliability of sensor 1000.

Figure 4:
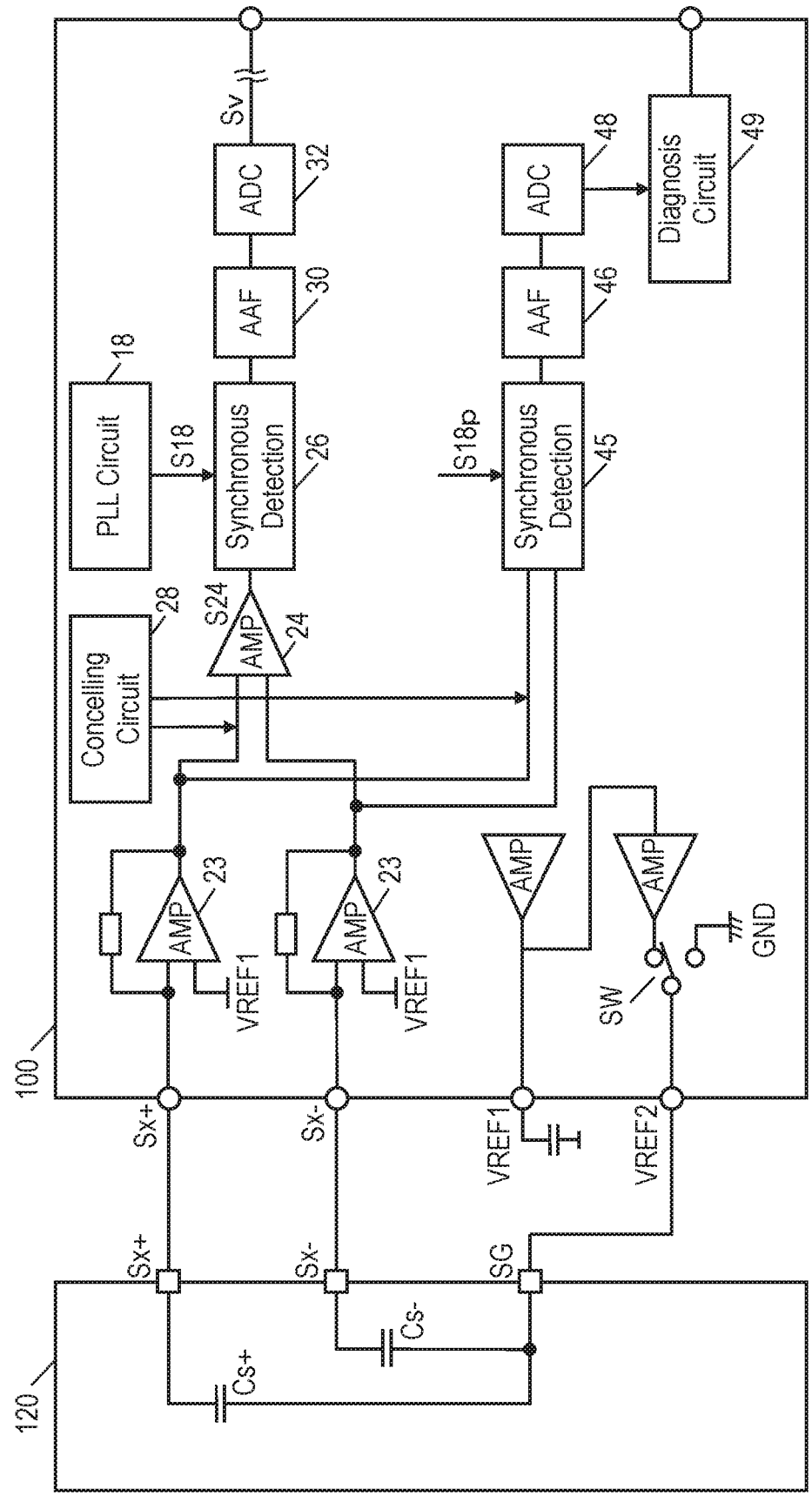
FIG. 4 is a block diagram of a part of the sensor in accordance with the embodiment.

FIG. 4 is a block diagram of a part of sensor 1000 in accordance with the embodiment. Circuit 100 includes synchronous detection circuit 45 that extracts an unnecessary signal from the angular velocity detection signal, antialiasing filter 46 that receives a signal from synchronous detection circuit 45, AD converting circuit 48 that receives a signal from antialiasing filter 46, diagnosis circuit 49 that receives a signal from AD converting circuit 48.

Cancelling circuit 28 inputs (adds) the cancelling signal to a node between amplifier 23 and synchronous detection circuit 45, and to a node between amplifier 24 and synchronous detection circuit 45.

Synchronous detection circuit 45 detects a signal having the cancelling signal added thereto by detecting signal S18$p$. The phase of detecting signal S18$p$ is shifted by 90 degrees from the phase of the driving signal, i.e., detecting signal S18 used for detecting the angular velocity. Therefore, synchronous detection circuit 45 allows the unnecessary signal component having substantially the same phase as the driving signal to pass through synchronous detection circuit 45, and eliminates an angular velocity signal component having a phase shifted by 90 degrees from the phase of the driving signal.

Diagnosis circuit 49 diagnoses presence or absence of abnormality of an open failure in which a connection between detection element 120 and circuit 100 is open. An operation of diagnosis circuit 49 will be described below.

In the normal state in which no abnormality occurs, the cancelling signal from cancelling circuit 28 is added, so that the unnecessary signal contained in the output of amplifier 23 is canceled to be substantially zero. However, in a case where one of the wirings connected to two amplifiers 23 is disconnected between detection element 120 and circuit 100, that is, an open failure occurs, a signal through the disconnected wiring is not input to amplifier 23 and is not output from amplifier 23. As a result, a noise component contained in the signal of the disconnected wiring is not input from amplifier 23 and not output from amplifier 23. On the other hand, since the operation of cancelling circuit 28 is not affected by the disconnection, an operation of adding the cancelling signal to the output of amplifier 23 continues even after the disconnection occurs. As a result, on a side in which the disconnection occurs, the cancelling signal added to the subsequent stage of amplifier 23 is not canceled and remains, and the cancelling signal remaining without being cancelled is input to synchronous detection circuit 45. As a result, when disconnection occurs, the signal output from synchronous detection circuit 45 increases. This change is monitored and detected by diagnosis circuit 49, so that the determination of the abnormality of the open failure can be performed. That is, diagnosis circuit 49 outputs an error signal when the signal input from AD converting circuit 48 exceeds a predetermined value.

Since synchronous detection circuit 45 receives a small signal which does not contain the noise signal and is within a small range, an input full-scale voltage of AD converting circuit 48 of the subsequent stage can be small. Therefore, even with the same AD conversion resolution, the number of bits of AD converting circuit 48 can be smaller than that of AD converting circuit 32, so that it is possible to place a diagnosis function while suppressing an increase in a circuit area.

In the above diagnosis method, the following processes are executed. The cancelling signal is added to a signal output from amplifier 23. A signal which is obtained by adding the cancelling signal is synchronously detected by a signal with a phase shifted by 90 degrees from the phase of the driving signal. The signal obtained by the synchronous detection is monitored and detected. In a different expression, the signal with the phase shifted by 90 degrees from the phase the driving signal is a signal with a phase shifted by 90 degrees from the phase of the detecting signal input from PLL circuit 18 to synchronous detection circuit 26. In another different expression, the signal with the phase shifted by 90 degrees from the driving signal is a signal with a phase shifted by 90 degrees from the phase of the detecting signal used for detecting of the angular velocity.

Figure 5:
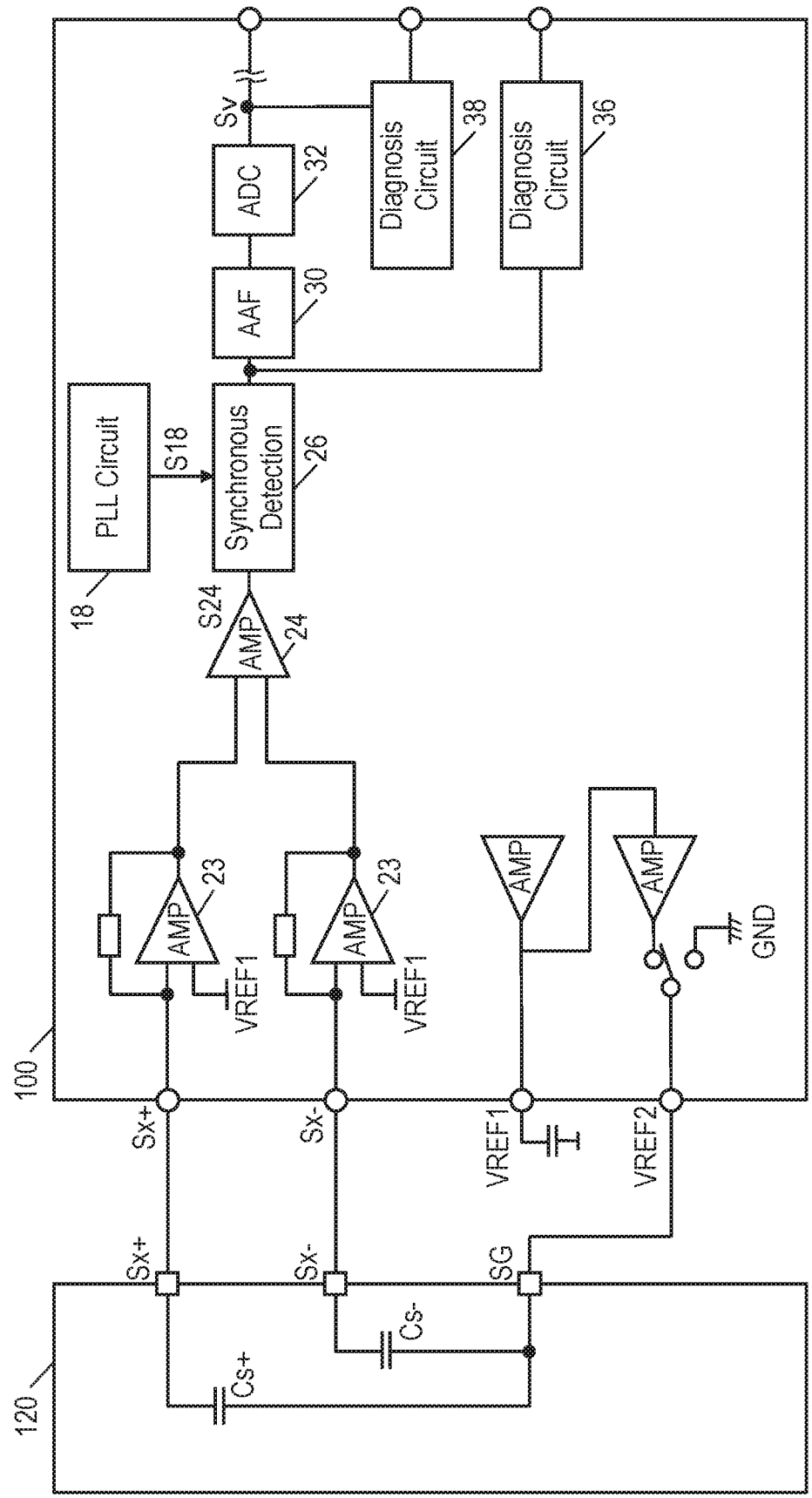
FIG. 5 is a block diagram of a part of the sensor in accordance with the embodiment.
Figure 6:
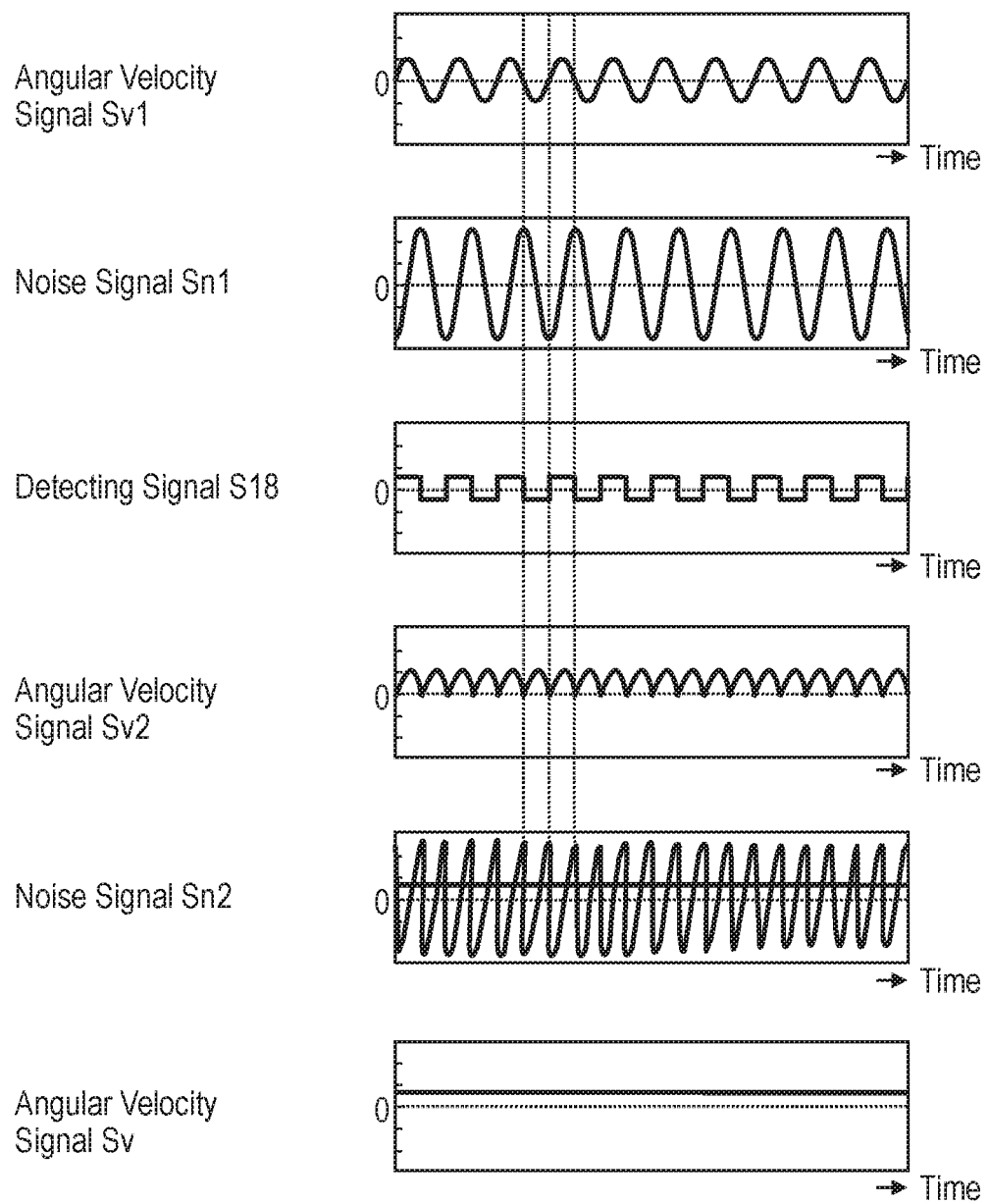
FIG. 6 is a waveform diagram of a detection signal of the sensor in accordance with the embodiment.

FIG. 5 is a block diagram of a part of sensor 1000 in accordance with the embodiment. FIG. 6 is a waveform diagram of detection signals. FIG. 6, for ease of explanation, shows the angular velocity signal and the noise signal separately.

An operation of sensor 1000 in accordance with the embodiment will be described below with reference to FIG. 6. FIG. 6 shows the waveforms of angular velocity signal Sv1 contained in angular velocity detection signal S24 before the synchronous detection and noise signal Sn1 contained in angular velocity detection signal S24, detecting signal S18, angular velocity signal Sv2 contained in angular velocity detection signal S26 after the synchronous detection, noise signal Sn2 contained in angular velocity detection signal S26, and angular velocity signal Sv after the AD conversion, that is, filter processing.

Angular velocity detection signal S24 contains angular velocity signal Sv1 corresponding to the angular velocity applied to detection element 120 and noise signal Sn1 which is generated due to the mechanical coupling (MC) of detection element 120, which is described above. The phase of noise signal Sn1 is substantially identical to the phase of driving signals D+ and D−, that is, noise signal Sn1 has a phase shifted by 90 degrees from the phase of angular velocity signal Sv1. Since angular velocity signal Sv1 is generated by a Coriolis force, angular velocity signal Sv1 has a phase shifted by 90 degrees from the phase of driving signals D+ and D−. Therefore, angular velocity detection signal S24 is synchronously detected by detecting signal S18 having substantially the same phase as angular velocity signal Sv1, so that noise signal Sn1 is suppressed and angular velocity signal Sv1 can be extracted as angular velocity signal Sv2.

Circuit 100 further includes diagnosis circuit 36 that receives a signal between synchronous detection circuit 26 and AD converting circuit 32, and diagnosis circuit 38 that receives an output from AD converting circuit 32.

Diagnosis circuit 36 receives a signal before a smoothing process is performed, which is a signal passing through synchronous detection circuit 26, before passing through AD converting circuit 32, that is, a signal of the sum of angular velocity signal Sv2 and noise signal Sn2 illustrated in FIG. 6. Diagnosis circuit 36 diagnoses that abnormality occurs in sensor 1000 when a range (amplitude) of the input signal is equal to or larger than a predetermined value, and outputs an error signal.

A signal in which the smoothing process is performed after passing through AD converting circuit 32, in another different expression, angular velocity signal Sv illustrated in FIG. 6 is input to diagnosis circuit 38. Diagnosis circuit 38 diagnoses that abnormality occurs in sensor 1000 when the range (amplitude) of the input signal is equal to or larger than a predetermined value, and outputs an error signal. Here, the "abnormality" means, for example, an input of an excessive angular velocity signal or a failure of various smoothing circuits including the AD converting circuit. In accordance with the embodiment, the predetermined value is, for example, a range of 90% of an output dynamic range of the AD converting circuit, i.e., a value just before saturation of the AD converting circuit slightly smaller than a value causing the AD converting circuit to saturate.

As illustrated in FIG. 6 and described relating to FIG. 6, noise signal Sn1 corresponding to the angular velocity has a larger range (amplitude) than angular velocity signal Sv1 contained in signals input to diagnosis circuit 36. Therefore, diagnosis circuit 36 monitors the amplitude of noise signal Sn1 and operates to diagnose that abnormality occurs in sensor 1000 in a case where the amplitude is equal to or larger than a predetermined value. On the other hand, only angular velocity signal Sv after the AD conversion (after the filter processing) is input to diagnosis circuit 38. Therefore, diagnosis circuit 38 monitors the amplitude of angular velocity signal Sv and operates to diagnose that abnormality occurs in sensor 1000 in a case where the amplitude is equal to or larger than the predetermined value.

Diagnosis circuit 36 has a larger threshold for determination to be used for diagnosis than diagnosis circuit 38. This is because the amplitude of the unnecessary signal is substantially 100 times to 1,000 times the amplitude of the angular velocity signal, so that the threshold of diagnosis circuit 36 for determination used in diagnosis is preferably substantially 100 times that of diagnosis circuit 38. Here, "the unnecessary signal is as large as substantially 100 times to 1,000 times the angular velocity signals" means, in a different expression, that a value obtained by converting the unnecessary signal into the angular velocity is substantially 100 times to 1,000 times the amplitude of the angular velocity indicated by the angular velocity signal.

As described above, diagnosis circuit 36 receives the signal after the synchronous detection and before passing through (smoothing) AD converting circuit 32. Diagnosis circuit 38 receives the signal after passing through (smoothing) AD converting circuit 32. Diagnosis circuits 36 and 38 diagnose accurately whether or not an excessive angular velocity is input. That is, if the signal input to synchronous detection circuit 26 is saturated, upper and lower symmetries of the waveform are lost and cannot be correctly canceled at the smoothing, so that, even though the angular velocity is not applied to detection element 120, an offset output is generated. In addition, if the signal is saturated, a problem that angular velocity detection signal S26 does not pass through AD converting circuit 32 and a correct angular velocity signal cannot be output occurs. Therefore, it is possible to prevent the occurrence of the problem by monitoring the signal before passing through AD converting circuit 32 (before smoothing).

In the diagnosis method, a signal between synchronous detection circuit 26 and AD converting circuit 32 is detected. A signal output from AD converting circuit 32 is detected.

Figure 7:
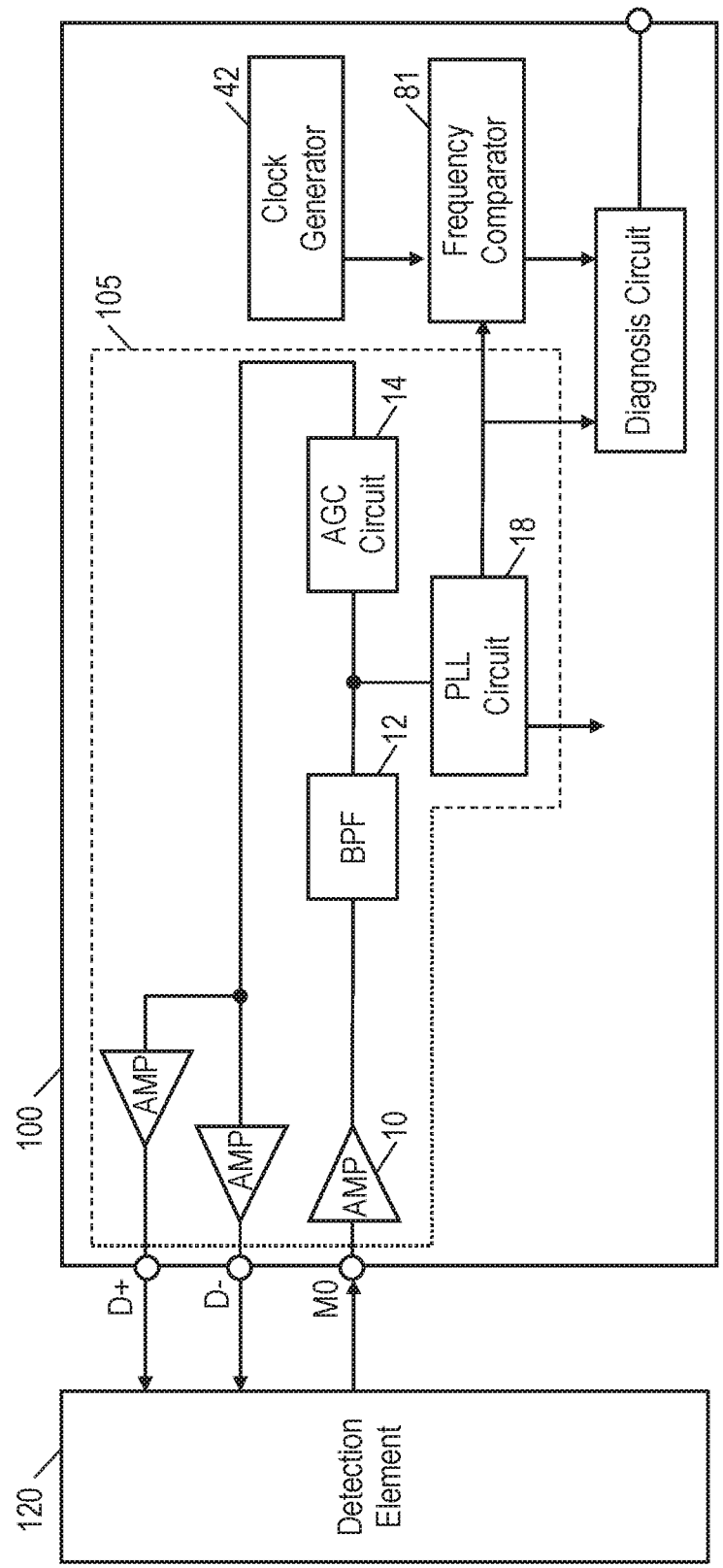
FIG. 7 is a block diagram of a part of the sensor in accordance with the embodiment.
Figure 8A:
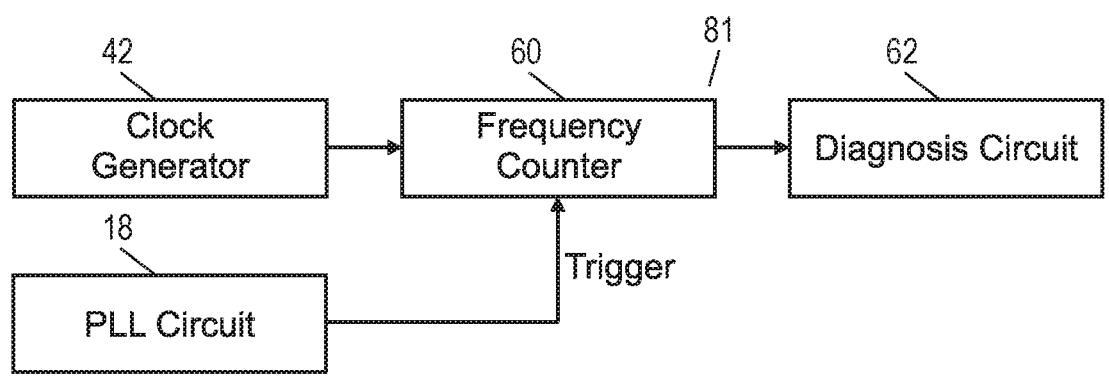
FIG. 8A is a block diagram of a frequency comparator of accordance with the sensor in the embodiment.
Figure 8B:
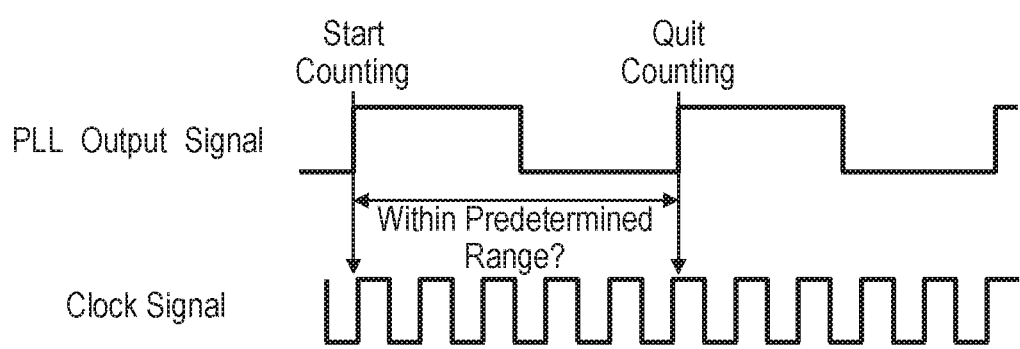
FIG. 8B is a waveform diagram of the frequency comparator of the sensor in accordance with the embodiment illustrating an operation of the frequency comparator.

FIG. 7 is a block diagram of a part of sensor 1000 in accordance with the embodiment. FIG. 8A is a block diagram of frequency comparator 81. FIG. 8B is a waveform diagram of frequency counter 60 for illustrating an operation of frequency counter 60.

Circuit 100 includes frequency counter 60 that receives a signal from PLL circuit 18 and a signal from clock oscillator 42 generating the internal clock, and diagnosis circuit 62 that receives a signal from frequency counter 60. Respective signal sources for PLL circuit 18 and clock oscillator 42 are independent of each other, and therefore, the frequency of the signal output from PLL circuit 18 is not proportional to the frequency of the signal output from clock oscillator 42.

Frequency counter 60 compares the frequency of the signal output from PLL circuit 18 to the frequency of the signal output from clock oscillator 42, and outputs a difference between the frequencies to diagnosis circuit 62.

Diagnosis circuit 62 monitors the difference between the frequency of the PLL output signal output from PLL circuit 18 and the frequency of the clock signal output from clock oscillator 42. For example, in a case where the frequency of the PLL output signal is lower than the frequency of the clock signal, diagnosis circuit 62 starts counting pulses of the clock signal from the time at a rising edge of the PLL output signal, and monitors whether or not the counted number of the pulses of the clock signal up to a rising edge of the next PLL output signal is within a predetermined value. If the counted number of the pulses is within the predetermined value, a frequency relationship between the PLL output signal and the clock signal is normal, and the error signal is set to a normal side. The error signal is configured to set an initial value thereof to an abnormal side and set the error signal to the normal side after determining that it is normal. In a different expression, diagnosis circuit 62 is preferably configured to output the error signal before the first count of frequency counter 60 is completed. Therefore, even in a case where the PLL output signal itself is stopped, it is possible to detect an abnormality. For example, in a case where a trigger signal for starting to count of the pulses cannot be obtained and the counting per se does not start, the PLL output signal per se stops. Even if either the PLL output signal or the clock signal is abnormal, it is possible to determine the failure, and it is possible to detect any failure of PLL circuit 18 and clock oscillator 42.

Japanese Patent No. 2003-264460 discloses a diagnosis method of comparing the frequencies between two signals. Specifically, signal SA obtained by frequency-dividing the clock and signal SB obtained by frequency-dividing the output clock of the voltage controlled oscillator are compared to each other to diagnose presence or absence of the abnormality. However, in this diagnosis method, since signal SB is a signal downstream of signal SA, in a different expression, signal SB is dependent on signal SA, in another different expression, the frequency of signal SB is proportional to the frequency of signal SA, and the same frequency abnormality may occur in signal SA and signal SB. Therefore, such an abnormality is not detected by the configuration disclosed in Japanese Patent Laid-Open Publication No. 2003-264460.

On the other hand, in the configuration shown in FIG. 7, since two signals of the PLL output signal and the clock signal which are independent of each other and are not proportional to each other in frequency are compared with each other, an abnormality occurring on one side does not affect the other side, hence detecting the failure that is not detected by the configuration disclosed in Japanese Patent Laid-Open Publication No. 2003-264460.

In the diagnosis method according to the embodiment, the difference between the frequency of the signal output from PLL circuit 18 and the frequency of the signal output from clock oscillator 42 is detected. In a case where the frequency difference is equal to or larger than a predetermined value, the error signal is output.

Figure 9:
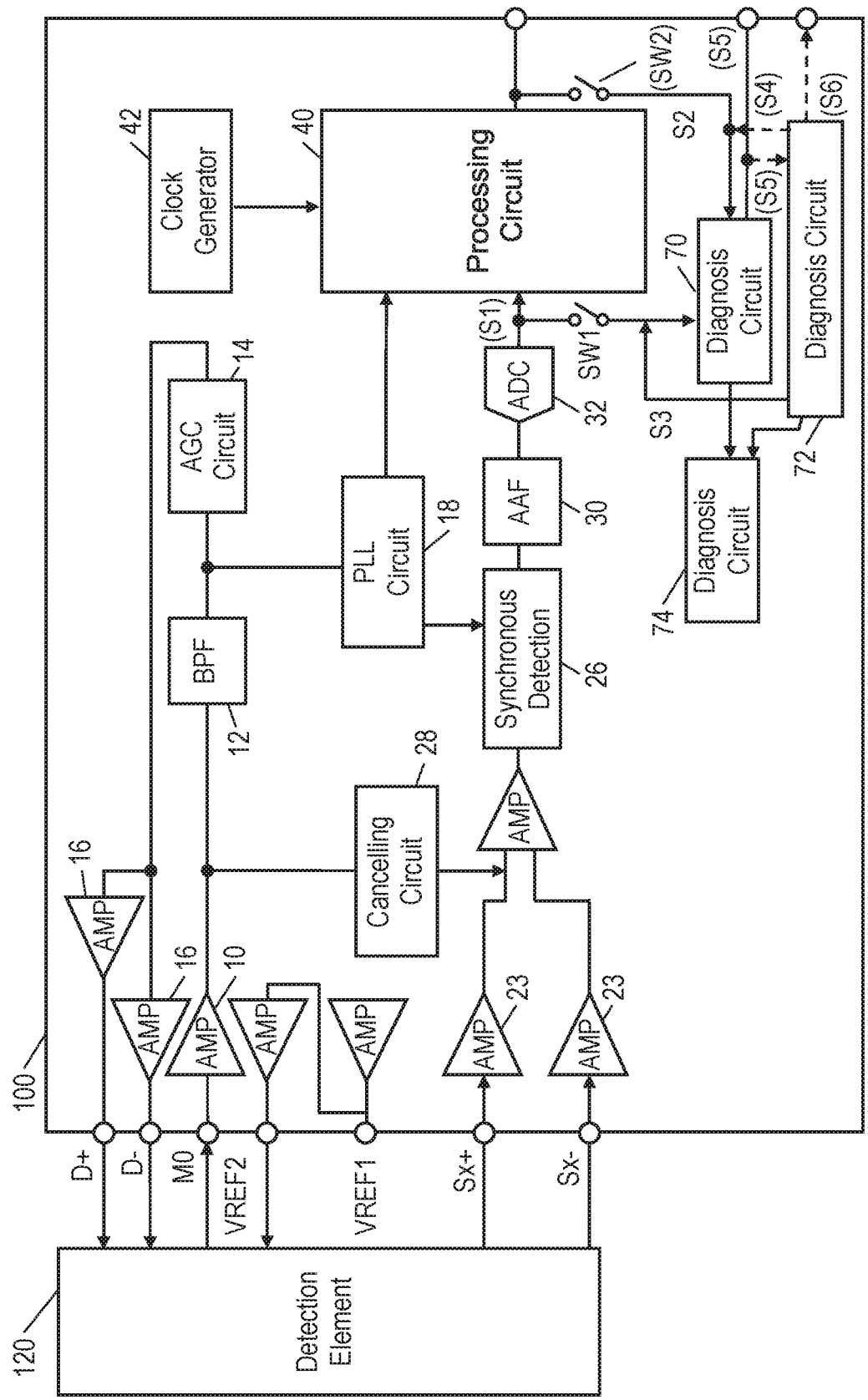
FIG. 9 is a block diagram of a part of the sensor in accordance with the embodiment.

FIG. 9 is a block diagram of a part of sensor 1000 in the embodiment.

Diagnosis circuit. 70 diagnoses a failure of processing circuit 40.

Diagnosis circuit 72 diagnoses a failure of diagnosis circuit 70. Specifically, when a failure of processing circuit 40 occurs, in order to diagnose whether or not diagnosis circuit 70 can detect a failure of processing circuit 40 when the failure occurs, it is determined whether or not diagnosis circuit 70 can reliably detect the failure by creating pseudo-failure. This point will be detailed below.

First, during a normal detection operation, switch SW1 is closed and diagnosis circuit 70 receives signal S1 from AD converting circuit 32, that is, signal S1 before being processed by processing circuit 40. Simultaneously to this, switch SW2 is closed and diagnosis circuit 70 receives signal S2 after being processed by processing circuit 40.

Diagnosis circuit 70 detects the failure of processing circuit 40 based on a relationship between signal S1 and signal S2. Specifically, in a case where processing circuit 40 normally operates, a predetermined relationship between signal S1 input to processing circuit 40 and signal S2 output from processing circuit 40 is satisfied. In a different expression, since a signal output in response to a certain input signal is previously determined, diagnosis circuit 70 monitors monitoring whether or not the relationship is maintained so as to monitor whether or not processing circuit 40 normally operates. In a case where the predetermined relationship between signal S1 and signal S2 is not satisfied, diagnosis circuit 70 outputs error signal S5 indicating that the failure occurs in processing circuit 40. As described above, processing circuit 40 processes the physical quantity signal (angular velocity signal Sv) corresponding to the physical quantity. In a case where signal S1 input to processing circuit 40 and signal S2 output from processing circuit 40 satisfy a predetermined condition, diagnosis circuit 70 outputs error signal S5. In a case where signal S1 input to processing circuit 40 and signal S2 output from processing circuit 40 do not satisfy the predetermined condition, diagnosis circuit 70 does not output error signal S5.

While diagnosis circuit 72 performs the diagnosis, switch SW1 is open and diagnosis circuit 70 receives diagnosis signal S3 from diagnosis circuit 72. Simultaneously to this, switch SW2 is closed and signal S2 after being processed by processing circuit 40 is input to diagnosis circuit 70. Diagnosis signal S3 has an amplitude different from that of signal S1. In a combination of diagnosis signal S3 and signal S2 input to diagnosis circuit 70, diagnosis signal S3 is determined so as to deviate from a relationship between the input and the output to and from processing circuit 40 which is normal. Therefore, since a combination of signals having a relationship between the input and the output to and from abnormal processing circuit 40 is input, diagnosis circuit 70 determines that processing circuit 40 has a failure, and outputs error signal S5. It is confirmed whether or not diagnosis circuit 70 normally operates by externally monitoring whether or not error signal S5 is output.

In accordance with the embodiment, it is confirmed whether or not diagnosis circuit 70 normally operates by externally monitoring whether or not error signal S5 is output, but it is not limited. For example, diagnosis circuit 72 may be configured to monitor whether or not error signal S5 is output from diagnosis circuit 70.

In accordance with the embodiment, while diagnosis circuit 72 performs the diagnosis operation, switch SW1 is open and diagnosis circuit 70 receives diagnosis signal S3 from diagnosis circuit 72, but it is not limited thereto. For example, while diagnosis circuit 72 performs the diagnosis operation, switch SW2 is open and diagnosis circuit 70 may receive diagnosis signal S4 from diagnosis circuit 72. The configuration illustrated in FIG. 9 including switch SW2, switch SW1 and a signal path for transmitting diagnosis signal S3 are unnecessary, and thus, circuit 100 may not necessarily include switch SW1 and a signal path for transmitting diagnosis signal S3. In this configuration, diagnosis circuit 70 receives diagnosis signal S4 from diagnosis circuit 72. Simultaneously, signal S1 before being processed by processing circuit 40 is input to diagnosis circuit 70. Diagnosis signal S4 has an amplitude different from that of signal S1, and in a combination of signal S1 and diagnosis signal S4 input to diagnosis circuit 70, diagnosis signal S4 is determined so as to deviate from a relationship between the input and the output to and from processing circuit 40 which is normal. Therefore, since a combination of signals having a relationship between the input and the output to and from abnormal processing circuit 40 is input, diagnosis circuit 70 determines that processing circuit 40 has a failure and outputs error signal S5. It is confirmed whether or not diagnosis circuit 70 normally operates by externally monitoring whether or not error signal S5 is output.

The operation of diagnosis circuit 72 may be described as follows.

Diagnosis circuit 72 outputs diagnosis signal S3 or diagnosis signal S4 to diagnosis circuit 70 instead of signal S1 input to processing circuit 40 or instead of signal S2 output from processing circuit 40.

In a case where diagnosis signal S3 is output to diagnosis circuit 70 instead of signal S1 input to processing circuit 40, a combination of diagnosis signal S3 and signal S2 output from processing circuit 40 is determined as a combination causing diagnosis circuit 70 to output error signal S5. If diagnosis circuit 70 normally operates, diagnosis circuit 70 outputs error signal S5 indicating that abnormality occurs in processing circuit 40. Diagnosis circuit 72 monitors whether or not error signal S5 is output from diagnosis circuit 70. Therefore, it is confirmed whether or not diagnosis circuit 70 is normally operated.

On the other hand, in a case where diagnosis signal S4 is output to diagnosis circuit 70 instead of signal S2 output from processing circuit 40, a combination of diagnosis signal S4 and signal S1 input to processing circuit 40 is set as a combination causing diagnosis circuit 70 to output error signal S5. If diagnosis circuit 70 normally operates, diagnosis circuit 70 outputs error signal S5 indicating that abnormality occurs in processing circuit 40. Diagnosis circuit 72 monitors whether or not error signal S5 is output from diagnosis circuit 70. Therefore, it is confirmed whether or not diagnosis circuit 70 normally operates.

As described above, diagnosis circuit 70 intentionally creates a state of outputting the error signal of processing circuit 40. In this case, diagnosis circuit 72 diagnoses whether or not diagnosis circuit 70 accurately performs the abnormality determination.

Particularly, diagnosis circuit 72 is preferably provided in a configuration occurring a single point failure. The single point failure is a failure in which a sensor is abnormal due to a single failure, and cannot perform detection or notification of the failure. Basically, the failure detection is performed by providing diagnosis circuit 70 at a portion in which the single point failure occurs. However, in a case where diagnosis circuit 70 fails before the failure of processing circuit 40 which is the circuit to be diagnosed, even if the circuit to be diagnosed fails after that, the failure detection cannot be performed. Therefore, the diagnosis of diagnosis circuit 70 is performed by diagnosis circuit 72, hence enhancing the reliability of sensor 1000.

In sensor 1000 in accordance with the embodiment, a configuration causing the single point failure is, for example, processing circuit 40. When processing circuit 40 fails, calculation (offset adjustment, gain adjustment, digital filter calculation, or the like) on the angular velocity signal to be input to processing circuit 40 is abnormal, so that an accurate sensor output signal cannot be output.

Diagnosis circuit 74 monitors whether or not diagnosis signal S3 output from diagnosis circuit 72 is input to diagnosis circuit 70. Therefore, in a case where diagnosis circuit 70 does not output error signal S5 when diagnosis signal S3 is output from diagnosis circuit 72 to diagnosis circuit 70, diagnosis circuit 74 determines whether or not this is due to the abnormality of diagnosis circuit 70 or an abnormality such that diagnosis circuit 72 cannot output diagnosis signal S3.

In this manner, the following effects can be obtained by determining whether diagnosis circuit 70 is abnormal or diagnosis circuit 72 is abnormal.

(Case 1) Case in which Diagnosis Circuit 70 is Abnormal

In a case where an abnormality occurs in Intended Function (IF) of processing circuit 40 due to the following failure, detection cannot be performed, thereby resulting in a latent fault (LF).

(Case 2) Case in which Diagnosis Circuit 72 is Abnormal (2a) In a case where an abnormality occurs IF due to the following failure, since diagnosis circuit 70 is normal, the failure detection can be performed.

(2b) In a case where an abnormality occurs in diagnosis circuit 70 due to the following failure, since IF is normal, it does not become a latent failure.

As described above, it is possible to determine whether or not a latent failure state occurs.

As described above, in sensor 1000, detection element 120 outputs detection signal Sx+ (Sx−) corresponding to the physical quantity. Driver circuit 105 outputs driving signal D+ (D−) to detection element 120 and receives monitor signal MO from detection element 120. Detection circuit 110 receives detection signal Sx+ (Sx−) and outputs the physical quantity signal (angular velocity signal Sv) corresponding to the physical quantity. Diagnosis circuit 70 is connected to detection circuit 110. Diagnosis circuit 72 is connected to diagnosis circuit 70. Diagnosis circuit 74 is connected to at least one of diagnosis circuit 70 and diagnosis circuit 72. Detection circuit 110 includes amplifier 23 that amplifies detection signal Sx+ (Sx−), synchronous detection circuit 26 that synchronously detects a signal from amplifier 23, and processing circuit 40 that processes a signal from synchronous detection circuit 26. Diagnosis circuit 70 is configured to receive signal S1 input to processing circuit 40 and signal S2 output from processing circuit 40, to output error signal S5 in a case where processing circuit 40 is abnormal, and not to output error signal S5 in a case where processing circuit 40 is normal. Diagnosis circuit 72 is configured to input diagnosis signal S3 (S4) to diagnosis circuit 70 instead of one of signal S1 input to processing circuit 40 and signal S2 output from processing circuit 40. Diagnosis circuit 72 is configured to input another of signal S1 input to processing circuit 40 and signal S2 output from processing circuit 40 to diagnosis circuit 70. Diagnosis circuit 74 is configured to monitor whether or not diagnosis signal S3 (S4) is input from diagnosis circuit 72 to diagnosis circuit 70.

The one of signal S1 input to processing circuit 40 and signal S2 output from processing circuit 40 is signal S1 input to processing circuit 40. In this case, diagnosis circuit 70 is configured to output error signal S5 in a case where diagnosis signal S3 and signal S2 output from processing circuit 40 are input.

The one of signal S1 input to processing circuit 40 and signal S2 output from processing circuit 40 is signal S2 output from processing circuit 40. In this case, diagnosis circuit 70 is configured to output error signal S5 in a case where diagnosis signal S4 and signal S1 input to processing circuit 40 are input.

Analog-to-digital converter 32 is connected between synchronous detection circuit 26 and processing circuit 40. Processing circuit 40 is a digital processing circuit.

The physical quantity is an angular velocity.

Processing circuit 40 processes signal S1 corresponding to the physical quantity signal (angular velocity signal Sv) corresponding to the physical quantity. In a case where signal S1 input to processing circuit 40 and signal S2 output from processing circuit 40 satisfy a predetermined condition, diagnosis circuit 70 outputs error signal S5. In a case where signal S1 input to processing circuit 40 and signal S2 output from processing circuit 40 do not satisfy a predetermined condition, diagnosis circuit 70 does not output error signal S5. Diagnosis circuit 72 is configured to input diagnosis signal S3 (S4) to diagnosis circuit 70 instead of one of signal S1 input to processing circuit 40 and signal S2 output from processing circuit 40. Diagnosis circuit 72 is configured to input, to diagnosis circuit 70, another of signal S1 input to processing circuit 40 and signal S2 output from processing circuit 40. Diagnosis circuit 74 is configured to monitor whether or not diagnosis signal S3 (S4) is input from diagnosis circuit to diagnosis circuit 70.

Figure 10:
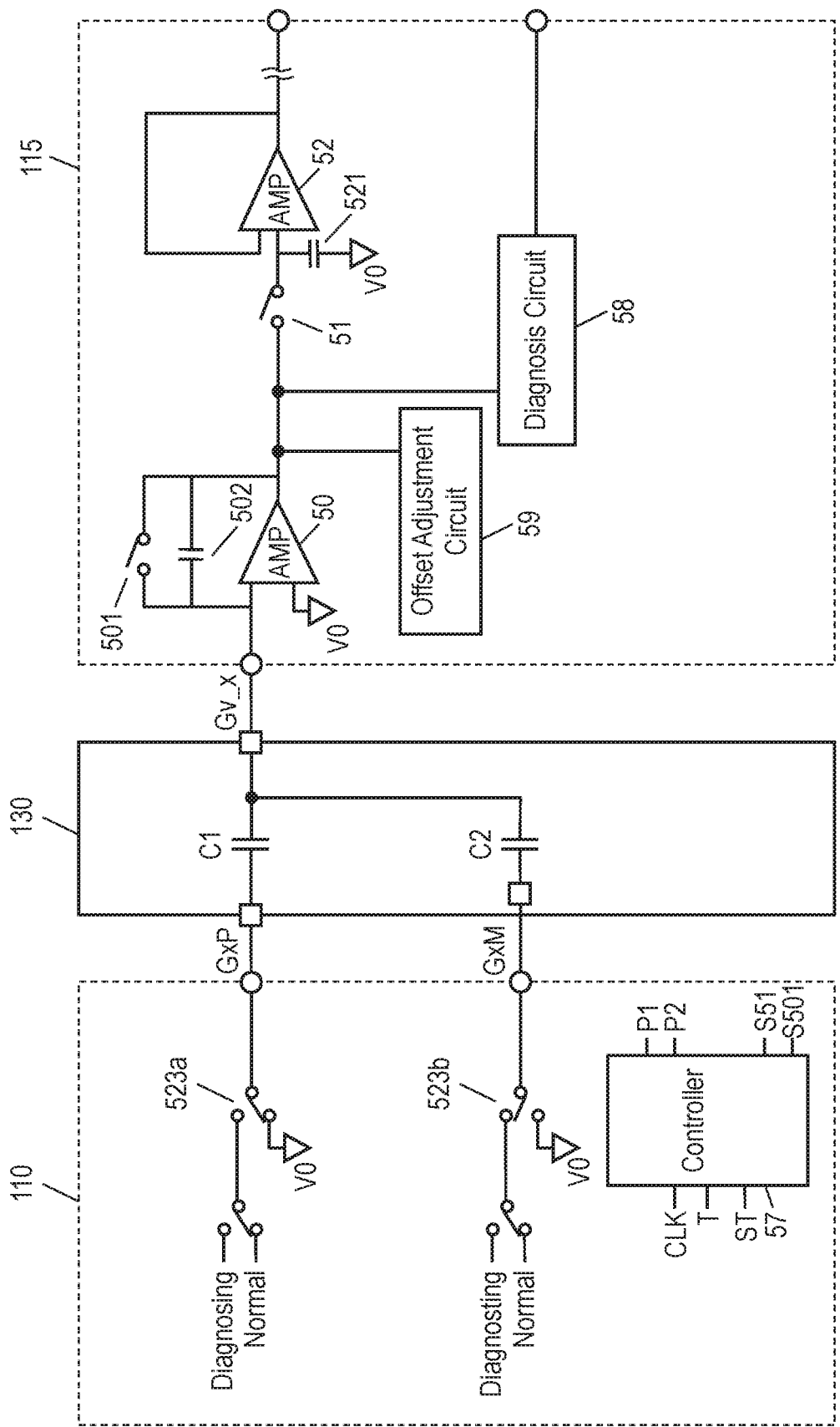
FIG. 10 is a block diagram of a part of the sensor in accordance with the embodiment.
Figure 11:
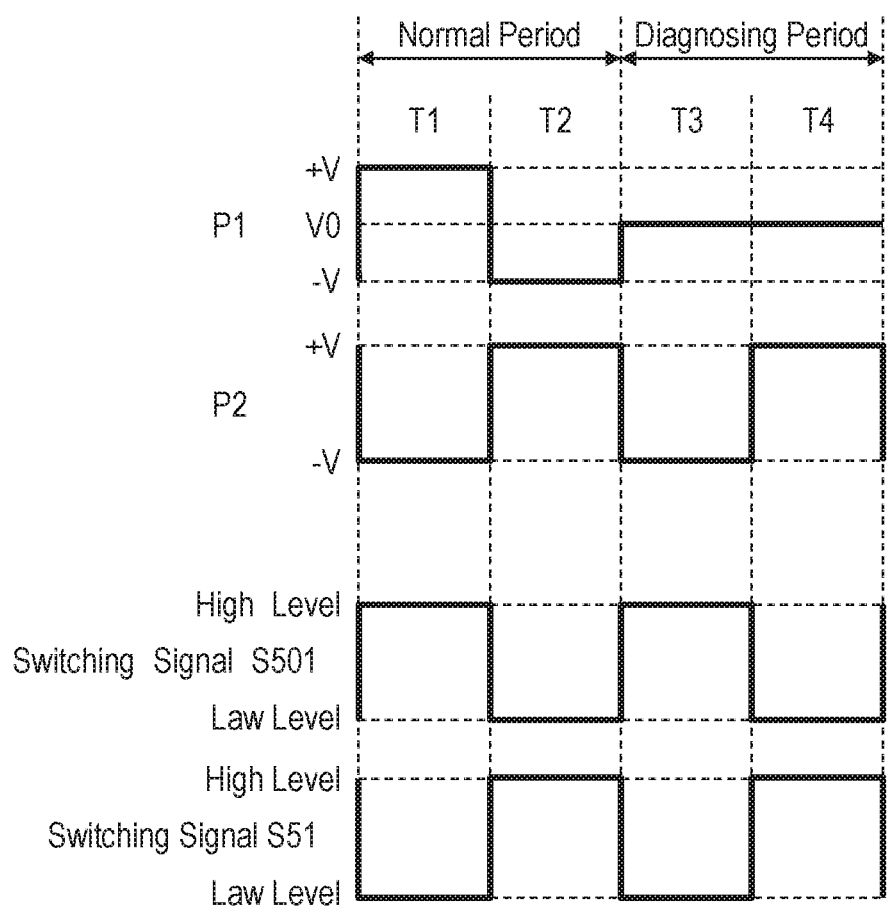
FIG. 11 is a waveform diagram of a driver circuit of the sensor in accordance with the embodiment for illustrating an operation of the driver circuit.

FIG. 10 is a block diagram of a part of sensor 1000 in accordance with the embodiment. FIG. 11 is a waveform diagram of driver circuit 155 connected to detection element 130 that detects the acceleration for illustrating an operation of driver circuit 155.

Amplifier 50 receives the acceleration detection signal that is a current from detection element 130, and converts the acceleration detection signal into a voltage. Amplifier 50 constitutes a current voltage (CV) conversion circuit.

Amplifier 52 samples (measures) an output voltage of amplifier 50 and holds the output voltage repetitively at a predetermined period. That amplifier 52 constitutes a sample hold circuit.

Controller 57 generates and outputs carrier signals P1 and P2, and switch signals S51 and S501 based on reference clock CLK and failure diagnosis signal ST. Carrier signal P1 is a signal with amplitude±V(=2·V) input to fixed electrode 133a. Carrier signal P2 is a signal with amplitude±V(=2·V) input to fixed electrode 133b. Switch signal S501 is a signal for opening and closing switch 501. Switch signal S51 is a signal for opening and closing switch 51. Switch 501 and switch 51 are implemented by switch elements, such as semiconductor switches. Switch 501 and switch 51 are closed when switch signal S501 and switch signal S51 from controller 57 are at a high level, respectively. Switch 501 and switch 51 are open when switch signal S501 and switch signal S51 are at a low level, respectively.

FIG. 11 illustrates carrier signal P1 input to fixed electrode 133a, carrier signal P2 input to fixed electrode 133b, switch signal S501 for opening and closing switch 501, and switch signal S51 for opening and closing switch 51.

For normal periods T1 and T2, a change in a capacitor generated in detection element 130 in accordance with the applied acceleration is measured. After that, for diagnosis periods T3 and T4, it is determined whether or not a signal path between driver circuit 115 and detection element 130 is disconnected.

Carrier signal P1 and carrier signal P2 are output from controller 57. Carrier signal P1 is a rectangular wave signal having a constant amplitude repetitively alternating high level (+V) and low level (−V) in normal periods T1 and T2. In addition, carrier signal P2 is a signal with a voltage inverted to carrier signal P1 in normal periods T1 and T2.

In normal period T1, carrier signal P1 has value +V and carrier signal P2 has value −V. In addition, switch 501 is closed and switch 51 is opened by switch signals S501 and S51 from controller 57. Therefore, reference voltage V0 is applied to a non-inverting input terminal of amplifier 50, reference voltage V0 is applied to movable electrode 132c, and a charge in capacitor 502 is discharged. In a measurement during the normal operation, switch 523a and switch 523b are not connected to reference voltage V0, and are connected so as to input carrier signals P1 and P2 to movable electrode 132c. In the measurement during the normal operation, switch 523a and switch 523b are not connected to reference voltage V0, and are connected so as to input carrier signals P1 and P2 to movable electrode 132c.

In this state, charge Q1 (Q1=−C1·V) is stored between movable electrode 132c and fixed electrode 133a. Sign "−" means that a negative electric charge is stored on a surface of movable electrode 132c facing fixed electrode 133a. In addition, charge Q2 (Q2=+C2·V) is stored between movable electrode 132c and fixed electrode 133b. Sign "+" means that a positive electric charge is stored on the surface of movable electrode 132c facing fixed electrode 133b. Since a total charge amount of movable electrode 132c is the sum (Q1−Q2=(C2−C1)·V) of charges Q1 and Q2.

For normal period T2, the voltage level of carrier signal P1 is inverted to that of carrier signal P2. Carrier signal P1 has value −V, and carrier signal P2 has value +V. Switch 501 is opened, and switch 51 is closed.

In this case, charge Q1' (Q1'=C1·V) is stored between movable electrode 132c and fixed electrode 133a, and charge Q2' (Q2'=−C2·V) is stored between movable electrode 132c and fixed electrode 133b. Since a total charge amount of movable electrode 132c is the sum (Q1'+Q2'=(C1−C2)·V) of charges Q1' and Q2'.

Difference ΔQ between charge (Q1+Q2) stored in movable electrode 132c in normal period T1 and charge (Q1'+Q2') stored in movable electrode 132c in normal period T2 is expressed as ΔQ=(Q1+Q2)−(Q1'+Q2')=−(C1−C2)·2·V.

In the case that capacitances C1 and C2 are different from each other, charge ΔQ is generated in movable electrode 132c. But, since a voltage of movable electrode 132c is held at reference voltage V0 by an operation of amplifier 50, charge ΔQ is stored on electrode connected to movable electrode 132c of capacitor 502, and charge ΔQ'=(C1−C2)·2·V with an opposite polarity is stored on an electrode opposite to capacitor 502. As a result, voltage ΔV1 (ΔV1=ΔQ'/Cf=(C1−C2)·2·V/Cf is generated on an output terminal of amplifier 50, and a voltage corresponding difference (C1−C2) of capacitances C1 and C2 is output, where Cf is the capacitance of capacitor 502.

Amplifier 52 operates to sample (measure) an output voltage of amplifier 50 in normal period T2 and hold (that is, sample-holds) the sampled voltage during the other periods. The output voltage from amplifier 52 is processed, such as amplification, to be the acceleration signal.

An operation of failure diagnosis will be described below.

For the failure diagnosis, for diagnosis period T3 and T4, one of switches 523a and 523b is connected to reference voltage V0 and the other thereof is not connected to reference voltage V0.

For example, a case where switch 523a is connected to reference voltage V0 will be described. In this case, for diagnosis period T3, voltages of movable electrode 132c and fixed electrode 133a are both reference voltage V0 and the voltage difference is zero, so that charge Q1 is also zero. On the other hand, charge Q2 (Q2=+C2·V) is stored between movable electrode 132c and fixed electrode 133b so as to be the same as normal period T1. Therefore, total charge (Q1+Q2) of movable electrode 132c is expressed as Q1+Q2=0+C·2·V=C·2·V.

In diagnosis period T4, charge Q1' is zero similar to diagnosis period T3, and charge Q2' (Q2'=−C2·V) similar to normal period T2. Therefore, total charge amount (Q1'+Q2') of movable electrode 132c is expressed as Q1'+Q2'=0−C2·V=−C2·V.

Difference ΔQ between charge (Q1+Q2) stored on movable electrode 132c for diagnosis period T3 and charge (Q1'+Q2') stored on movable electrode 132c for diagnosis period T4 is expressed as ΔQ=(Q1+Q2)−(Q1'+Q2')=C2·2·V. As a result, voltage ΔV2 (ΔV2=−ΔQ/Cf=−C2·2·V/Cf is generated on the output terminal of amplifier 50.

In a case where the signal path is normal, output voltage V50 of amplifier 50 is expressed as V50=−C2·2·V/Cf. However, in a case where the signal path is disconnected, output voltage V50 of amplifier 50 is zero. Therefore, diagnosis circuit 58 determines whether or not the signal path is disconnected by determining whether or not output voltage V50 of amplifier 50 exceeds a predetermined threshold. In addition, in the configuration, even in a case where the acceleration applied to detection element 130 is zero, since capacitance C2 is not zero, output voltage V50 (−C2·2·V/Cf) of amplifier 50 at the normal time and output voltage V50 (zero) of amplifier 50 at the disconnection be determined.

As described above, in sensor 1000 in accordance with the embodiment, for normal periods T1 and T2, the normal operation of measuring the change in capacitances C1 and C2 in accordance with the acceleration that is the input physical quantity is performed. In addition, for diagnosis periods T3 and T4, the failure diagnosis operation for determining whether or not the signal path to a circuit for detecting the capacitance is disconnected is performed. Therefore, the failure diagnosis can be performed without displacing movable electrode 132c, and a time for the failure diagnosis is reduced.

Amplifier 50 includes offset adjustment circuit 59. Offset adjustment circuit 59 preferably operates in a normal mode that is a first mode and stops in a failure diagnosis mode that is a second mode. That is, offset adjustment circuit 59 is configured such that an offset amount of amplifier 50 in the normal period is canceled. In the failure diagnosis period, since the offset amount of amplifier 50 is a value different from that in the normal period, the adjustment of the offset of offset adjustment circuit 59 is stopped in the failure diagnosis period, so that the offset is adjusted and erroneous detection of diagnosis circuit 58 can be avoided by the change. Moreover, the "offset" referred in here means an offset voltage amount appearing at the output of amplifier 50. The offset voltage amount is a signal obtained by adding the offset signal from detection element 130 and the offset signal generated by amplifier 50 itself. In the first mode, the offset voltage amount is canceled by offset adjustment circuit 59 including a DA converter, a current input circuit, and the like.

In FIG. 10, offset adjustment circuit 59 is provided at a subsequent stage of amplifier 50, but is not limited thereto, and for example, may be provided at a preceding stage of amplifier 50.

Sensor 1000 in accordance with the embodiment includes detection element 120 (and portions for driving and detection thereof) that detects the angular velocity and detection element 130 (and portions for driving and detection thereof) that detects the acceleration, but is not limited thereto. For example, sensor 1000 may include only detection element 120 (and the portions for driving and detection thereof) that detects the angular velocity or only detection element 130 (and the portions for driving and detection thereof) that detects the acceleration.

In sensor 1000 in accordance with the embodiment, detection element 120 detects the angular velocity about one axis, and detection element 130 detects an acceleration along one axis, but is not limited thereto. For example, detection element 120 may detect angular velocities about three axes, and detection element 130 may detect accelerations along three axes.

In accordance with the embodiment, the piezoelectric body is employed for detecting the angular velocity, but is not limited thereto, and for example, electrostatic capacitance may be used for detection.

In accordance with the embodiment, detection element 120 detecting the angular velocity is the tuning-fork type detection element, but is not limited thereto, and for example, may be another vibration type detection element such as a detection element having a fixed beam and six vibration beams extending in directions opposite to each other at each of both ends and a center of the fixed beam.

In accordance with the embodiment, the detection element 130 for the acceleration has a structure (bulk type or torsion type) in which a weight is supported on a beam, but is not limited thereto, and for example, may be another capacitance type detection element, such as a comb-shaped detection element, and a surface type detection element.

The configurations illustrated in FIGS. 3 to 5, 7, and 9 may be used in duplicate for one sensor 1000 or only a part thereof may be used.

In accordance with the embodiment, terms, "equal" and "same", do not mean that they are physically completely equal and completely same, but also include errors, and also include a difference that is practically equal or may be treated as the same in practical use.

What is claimed is:
1. A sensor comprising:
a detection element that outputs a detection signal corresponding to a physical quantity;
a driver circuit that outputs a driving signal to the detection element and receives a monitor signal input from the detection element;
a detection circuit that receives the detection signal input thereto and outputs a physical quantity signal corresponding to the physical quantity;
a first diagnosis circuit connected to the detection circuit;
a second diagnosis circuit connected to the first diagnosis circuit; and
a third diagnosis circuit connected to at least one of the first diagnosis circuit and the second diagnosis circuit,
wherein the detection circuit includes:
an amplifier that amplifies the detection signal;
a synchronous detection circuit that synchronously detects a signal from the amplifier; and
a processing circuit that processes a signal from the synchronous detection circuit, and outputs the processed signal,
wherein the first diagnosis circuit is configured:
to receive a signal input to the processing circuit and a signal output from the processing circuit;
to output an error signal in a case where the processing circuit is abnormal; and
not to output the error signal in a case where the processing circuit is normal,
wherein the second diagnosis circuit is configured:
to input a diagnosis signal to the first diagnosis circuit instead of one of the signal input to the processing circuit and the signal output from the processing circuit; and to input, to the first diagnosis circuit, another of the signal input to the processing circuit and the signal output from the processing circuit, and wherein the third diagnosis circuit is configured to monitor whether or not the diagnosis signal is input from the second diagnosis circuit to the first diagnosis circuit.

2. The sensor of claim 1, wherein the one of the signal input to the processing circuit and the signal output from the processing circuit is the signal input to the processing circuit, and wherein the first diagnosis circuit is configured to output the error signal in a case where the diagnosis signal and the signal output from the processing circuit are input to the first diagnosis circuit.

3. The sensor of claim 1, wherein the one of the signal input to the processing circuit and the signal output from the processing circuit is the signal output from the processing circuit, and wherein the first diagnosis circuit is configured to output the error signal in a case where the diagnosis signal and the signal input to the processing circuit are input to the first diagnosis circuit.

4. The sensor of claim 1, further comprising an analog-to-digital converter connected between the synchronous detection circuit and the processing circuit, wherein the processing circuit is a digital processing circuit.

5. The sensor of claim 1, wherein the physical quantity is an angular velocity.

6. A sensor comprising:

a detection element that outputs a detection signal corresponding to a physical quantity;

a processing circuit that receives the detection signal input thereto, processes a signal corresponding to a physical quantity signal corresponding to the physical quantity, and outputs the processed signal;

a first diagnosis circuit connected to the processing circuit;

a second diagnosis circuit connected to the first diagnosis circuit; and a third diagnosis circuit connected to at least one of the first diagnosis circuit and the second diagnosis circuit, wherein the first diagnosis circuit is configured:

to output an error signal in a case where a signal input to the processing circuit and a signal output from the processing circuit satisfy a predetermined condition; and not to output the error signal in a case where the signal input to the processing circuit and the signal to be output from the processing circuit do not satisfy the predetermined condition, wherein the second diagnosis circuit is configured;

to input a diagnosis signal to the first diagnosis circuit instead of one of the signal input to the processing circuit and the signal output from the processing circuit; and to input, to the first diagnosis circuit, another of the signal input to the processing circuit and the signal output from the processing circuit, and wherein the third diagnosis circuit is configured to monitor whether or not the diagnosis signal is input from the second diagnosis circuit to the first diagnosis circuit.

7. The sensor of claim 6, wherein the one of the signal input to the processing circuit and the signal output from the processing circuit is the signal input to the processing circuit, and wherein the first diagnosis circuit is configured to output the error signal in a case where the diagnosis signal and the signal output from the processing circuit are input to the first diagnosis circuit.

8. The sensor of claim 6, wherein the one of the signal input to the processing circuit and the signal output from the processing circuit is the signal output from the processing circuit, and wherein the first diagnosis circuit is configured to output the error signal in a case where the diagnosis signal and the signal input to the processing circuit are input to the first diagnosis circuit.

9. The sensor of claim 6, wherein the processing circuit abnormally operates in a case where the signal input to the processing circuit and the signal output from the processing circuit satisfy the predetermined condition, and wherein the processing circuit normally operates in a case where the signal input to the processing circuit and the signal output from the processing circuit do not satisfy the predetermined condition.

* * * * *